(12) United States Patent
Peterman

(10) Patent No.: US 10,384,488 B2
(45) Date of Patent: Aug. 20, 2019

(54) MULTIPLE LAYER FOAM INSERT FOR TIRES

(71) Applicant: Mark Henry Peterman, Saratoga Springs, NY (US)

(72) Inventor: Mark Henry Peterman, Saratoga Springs, NY (US)

(*) Notice: Subject to any disclaimer, the term of this patent is extended or adjusted under 35 U.S.C. 154(b) by 0 days.

(21) Appl. No.: 15/966,726

(22) Filed: Apr. 30, 2018

(65) Prior Publication Data

US 2018/0244106 A1    Aug. 30, 2018

Related U.S. Application Data

(63) Continuation-in-part of application No. 15/292,664, filed on Oct. 13, 2016.

(Continued)

(51) Int. Cl.
| | |
|---|---|
| *B29D 30/04* | (2006.01) |
| *B60C 19/12* | (2006.01) |
| *B60C 7/10* | (2006.01) |
| *B29D 30/02* | (2006.01) |
| *B29C 48/06* | (2019.01) |
| *B29C 48/21* | (2019.01) |
| *B29C 48/00* | (2019.01) |

(Continued)

(52) U.S. Cl.
CPC .......... *B60C 7/105* (2013.01); *B29C 48/0021* (2019.02); *B29C 48/06* (2019.02); *B29C 48/21* (2019.02); *B29D 30/02* (2013.01); *B29D 30/04* (2013.01); *B60C 5/002* (2013.01); *B60C 17/065* (2013.01); *B29L 2030/006* (2013.01); *B29L 2030/008* (2013.01); *B60C 2200/12* (2013.01)

(58) Field of Classification Search
CPC ..... B60C 5/00; B60C 5/002; B60C 2001/009; B60C 7/08; B60C 7/10; B60C 7/22; B29D 30/04; B29D 2030/0683
See application file for complete search history.

(56) References Cited

U.S. PATENT DOCUMENTS

| | | | |
|---|---|---|---|
| 1,352,885 A | * | 9/1920 | Fukuda .................. B60C 7/102 152/313 |
| 4,371,023 A | | 2/1983 | Campagna |

(Continued)

FOREIGN PATENT DOCUMENTS

| | | | |
|---|---|---|---|
| CA | 2562440 | * | 4/2007 |
| JP | 53-32503 | * | 3/1978 |
| WO | 2018/004344 A1 | | 1/2018 |

OTHER PUBLICATIONS

U.S. Patent and Trademark Office (ISA/US)—International Search Report and Written Opinion of ISA dated Jun. 26, 2018 from PCT/US18/30222 (total 11 pages).

(Continued)

*Primary Examiner* — Justin R Fischer
(74) *Attorney, Agent, or Firm* — Barclay Damon LLP

(57) ABSTRACT

A multi-layer or multi-section foam insert replacement for a pneumatic inner tube emulates the effect of air pressure, across a wide range of temperatures and pressures, while maintaining the weight of a conventional air-filled pneumatic tube. Through the use of different density materials and/or the orientation and thickness of such materials, desirable handling properties are achieved. The multi-layer/multi-section foam insert can be produced by steam molding or extrusion of foam materials.

10 Claims, 12 Drawing Sheets

Related U.S. Application Data

(60) Provisional application No. 62/391,063, filed on Apr. 19, 2016.

(51) Int. Cl.
    *B60C 5/00*     (2006.01)
    *B60C 17/06*     (2006.01)
    *B29L 30/00*     (2006.01)

(56) References Cited

U.S. PATENT DOCUMENTS

| | | |
|---|---|---|
| 4,392,522 A | 7/1983 | Bschorr |
| 4,919,183 A | 4/1990 | Dobson |
| 6,054,078 A | 4/2000 | Lauer et al. |
| 6,568,443 B2 * | 5/2003 | Shoner ............ B60C 5/20 152/157 |
| 2007/0079916 A1 | 4/2007 | Garavaglia |
| 2011/0198007 A1 | 8/2011 | Maeda |
| 2012/0247634 A1 | 10/2012 | Liao |
| 2017/0079916 A1 | 10/2017 | Peterman |

OTHER PUBLICATIONS

International Bureau of WIPO—International Preliminary Report on Patentability dated Oct. 23, 2018 from PCT/US17/21051 (total 7 pages).

USPTO (ISA/US), International Search Report/ Written Opinion from PCT International Appl. No. PCT/US17/21051, completed May 9, 2017 (dated Jul. 6, 2017).

\* cited by examiner

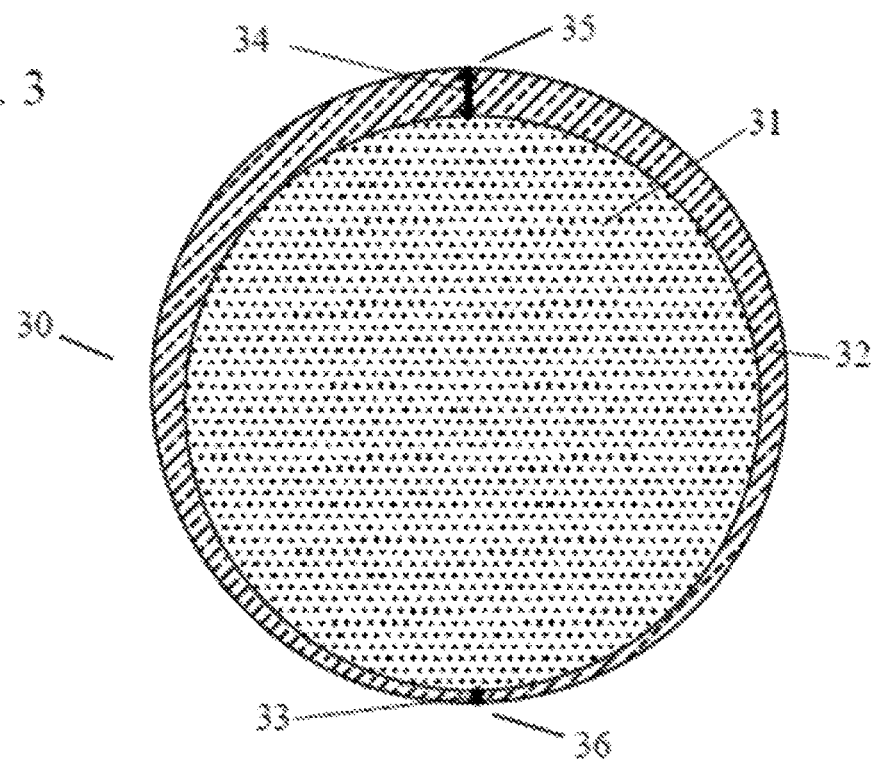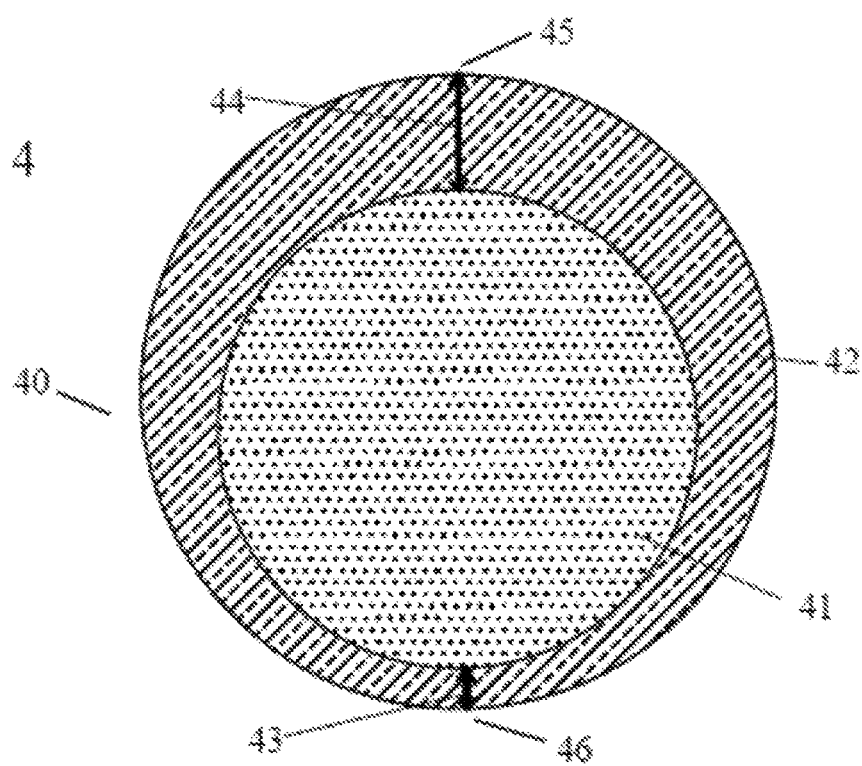

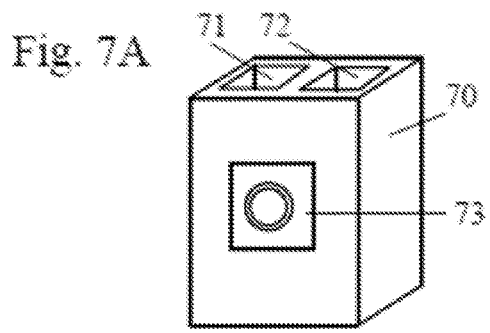
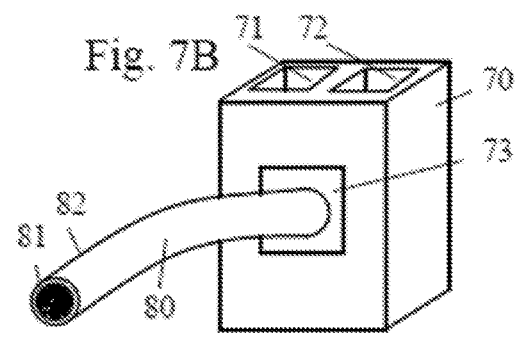
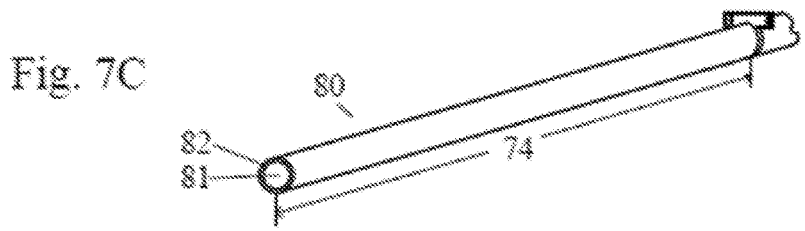
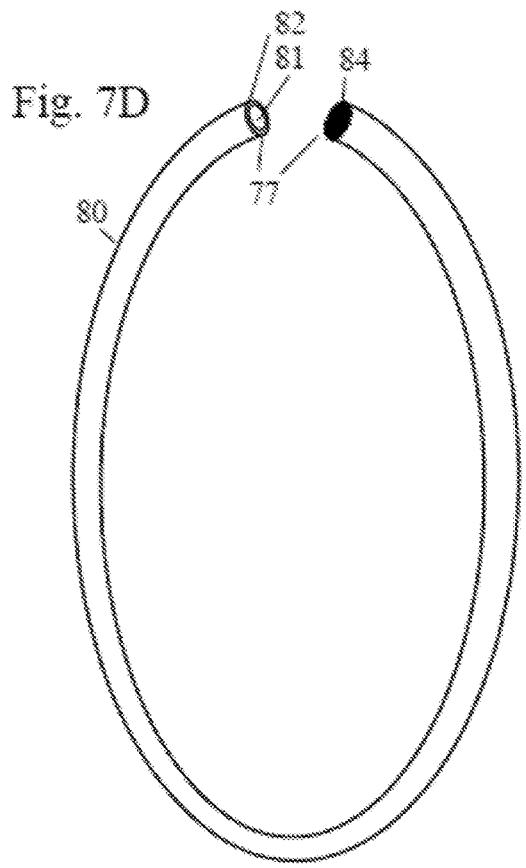
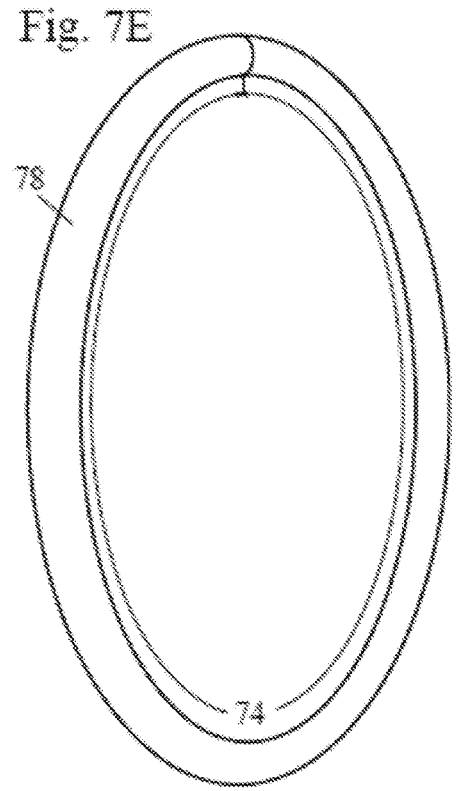

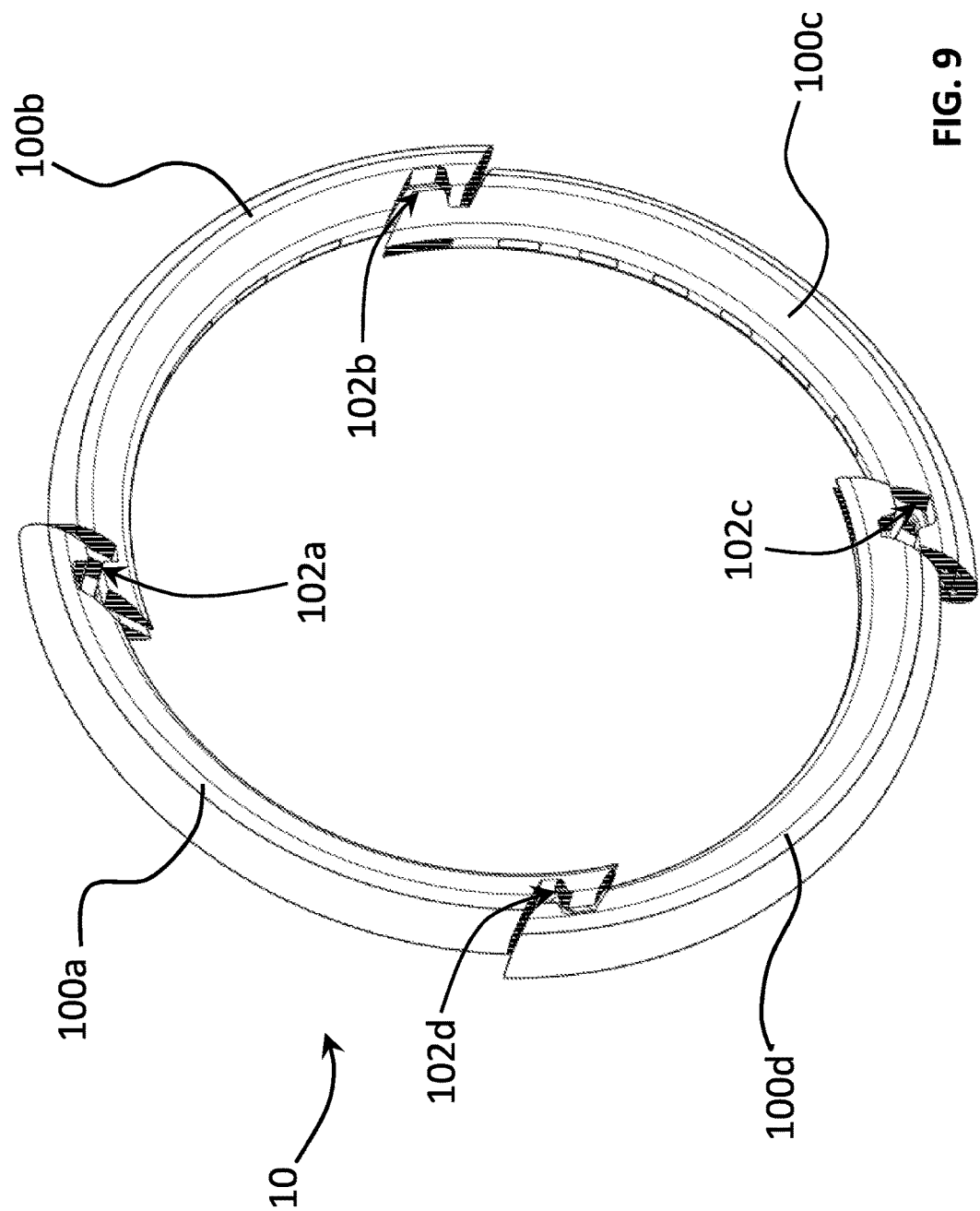

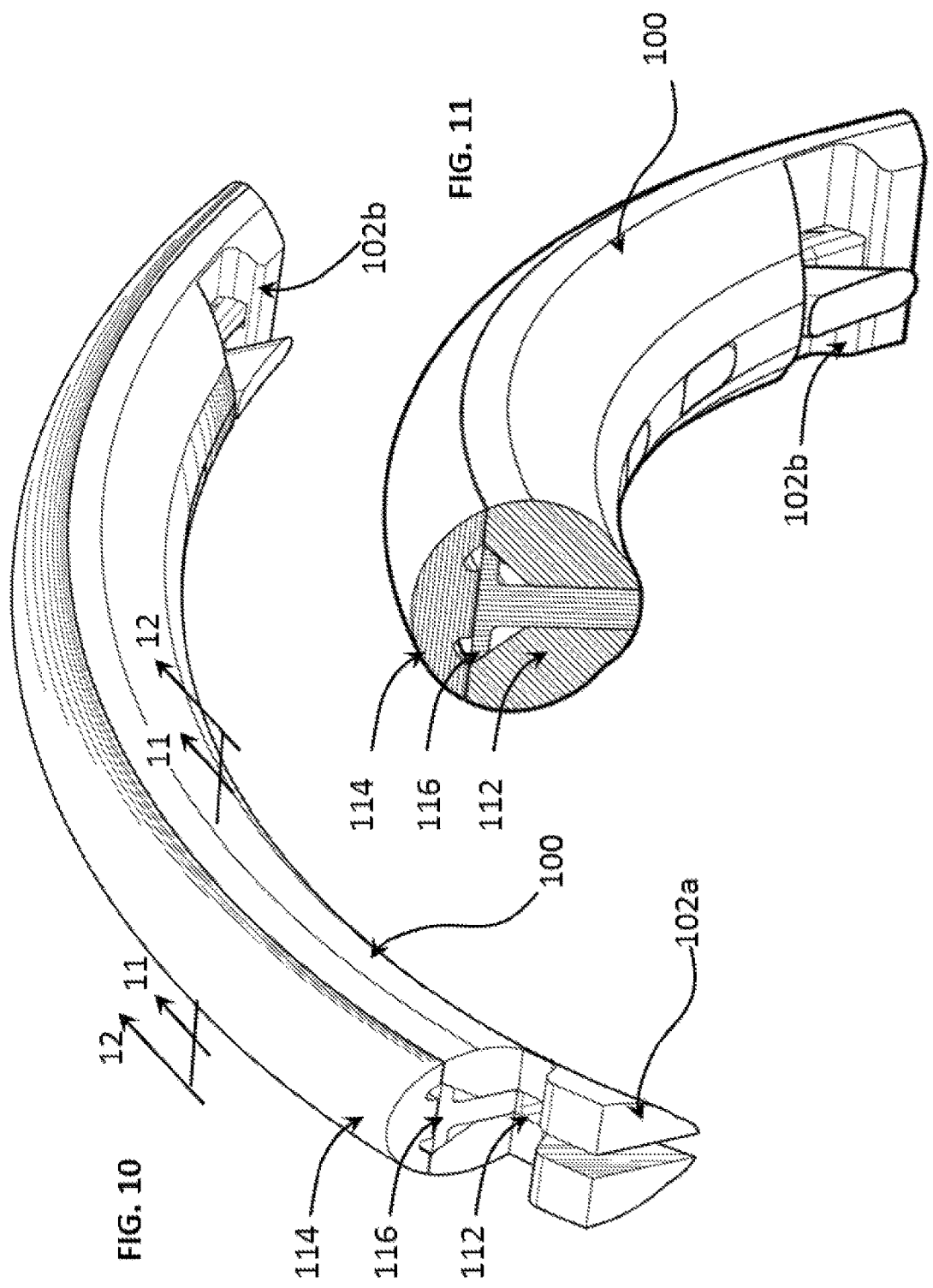

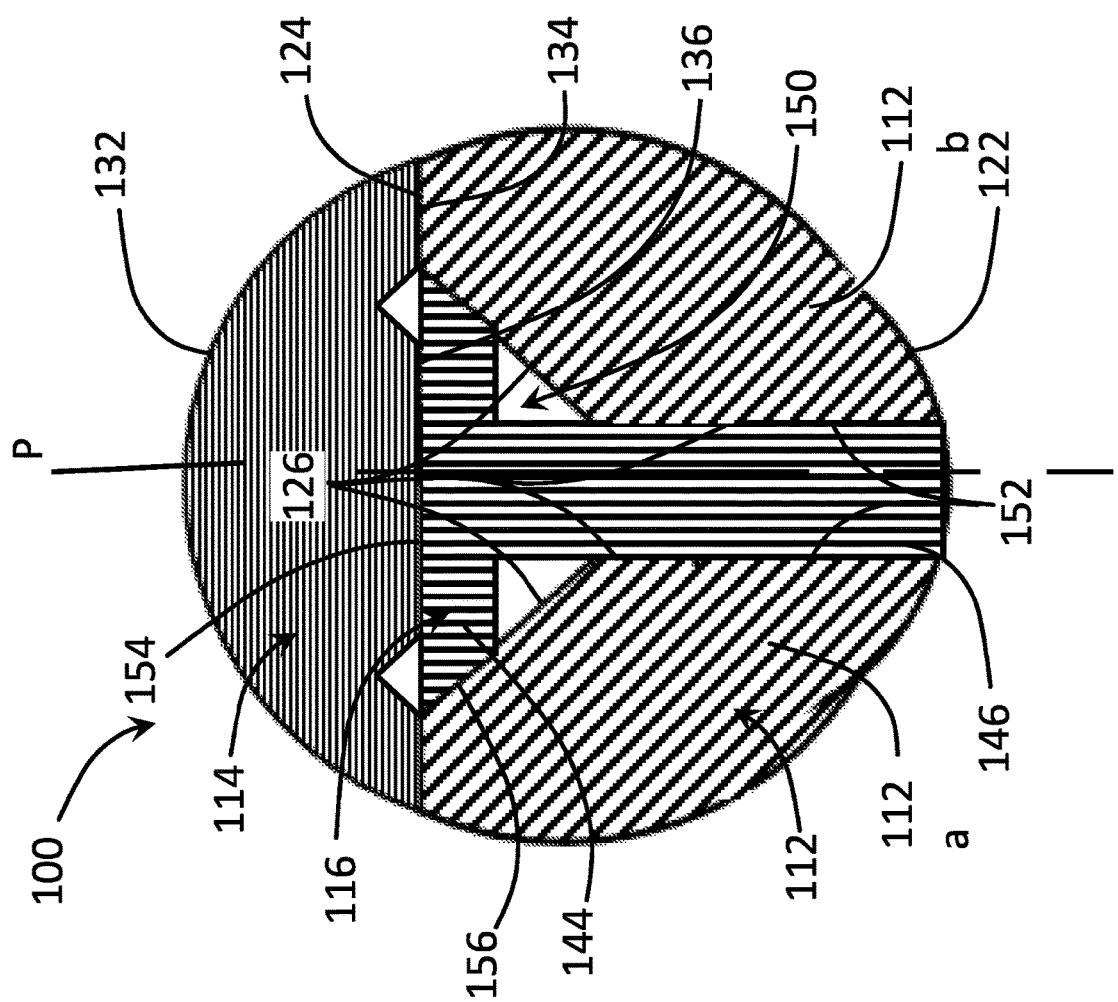

MULTIPLE LAYER FOAM INSERT FOR TIRES

PRIORITY CLAIM

This application is a Continuation in Part, and claims the benefit and priority, of U.S. patent application Ser. No. 15/292,664 entitled "Multiple Layer Foam Insert for Tires" which the claims priority to Provisional Patent Application Ser. No. 62/391,063, filed Apr. 19, 2016, entitled "Round tubular structure comprised of multi density extruded foam that when placed into the cavity of a pneumatic tire replaces the air filled tube formerly used to provide pressure and strength to the tire." The benefit under 35 USC § 119(e) of the United States provisional application is hereby claimed, and the aforementioned application is hereby incorporated herein by reference.

BACKGROUND OF THE INVENTION

Field of the Invention

The invention pertains to the field of inner tubes for vehicle tires. More particularly, the invention pertains to a foam insert for use in tire and tube systems in bicycles, motorcycles, automobiles, trucks and other vehicles.

Description of Related Art

The susceptibility of the pneumatic tire to puncture is inherent in the nature of the elastomeric material that comprises the tire or the tire and the inner tube in the case of a bicycle or tube-type motor vehicle tire. When inflated, such elastomeric materials have the characteristics of providing both a cushioned ride along with enhanced traction for greater handling performance. These same materials have the unfortunate characteristic of being ruptured and caused to fail when punctured by a sharp object.

Bicycle tires usually have a narrow outer rubber casing having a thin cross-section and an inner, air filled, butyl material inner tube. Such tires are typically inflated at a significantly higher pressure than is commonly employed in motor vehicle tires. Unfortunately, sharp objects can easily penetrate the outer rubber casing in addition to the underlying inner tube.

Flat tires are a common occurrence for all types of bicycles and can be very frustrating for all types of bicycle rider. While a child's bike with pneumatic tires can be bothersome, the adult performance rider can be stranded in a remote location as a consequence of a flat tire. While many bike riders carry tire repair kits, tools and other devices such as the sealing materials for repairing flat tires are often defective making such repairs difficult when the need arises. In any event, penetration of the outer tire by thorns or other sharp objects resulting in the puncture of the inner tube and a flat tire can be a very unpleasant and frustrating experience.

Various efforts have been made regarding the susceptibility to puncture and how such puncture may be avoided. Methods which attempt to prevent puncture include tire liners which are attached to the inside of the tire casing or sandwiched by air pressure between the casing and an inner tube. Such liners are costly, add significantly to the weight of the tire, and degrade the performance of the bike for the cyclist.

Other solutions have sought to use solid rubber tubes in place of an air-filled tube. While such solid tires solve the problem of air loss, the high weight and lack of cushioning render the bicycle nearly unrideable. That is, the weight of solid elastomer makes for a sluggish and jarring ride for the rider. Solid tubes are entirely unaccepted by performance cyclists inasmuch as every ounce of weight must be carried up a mountainous terrain along with the weight of the cyclist.

It is also common to fill tires for off-road vehicles such as farm tractors or road-construction equipment with a liquid, i.e., most often water or, in colder climates, a solution of calcium chloride, ethylene glycol, propylene glycol and water. Such liquid acts as ballast for increasing traction and reducing tire wear. Finally, injected liquid solutions with small fibers in suspension have also been employed, however these are short-term, heavy and messy to install.

Examples of prior art tires and/or tubes are as follows:

U.S. Pat. No. 4,471,827, entitled "Non-pneumatic Insert Tube For Tires" issued in 1984, shows a non-pneumatic insert tube for a tire adapted for mounting upon a circular rim. The insert tube comprises an elongated resilient plastic cylinder having a thin wall defining a continuous bore which extends throughout the full length of the tube.

U.S. Pat. No. 5,795,414, entitled "Puncture Resistant Tire Assembly" issued in 1998, shows a puncture resistance pneumatic tire assembly. The tire assembly includes an inner tube having an outer periphery comprising a plurality of protruding deflectable structures which are circumferentially continuous about the inner tube body.

U.S. Pat. No. 6,418,991, entitled "Puncture Proof Inner Tube" issued in 2002, provides an improved pneumatic tube formed from a semi-rigid, air-tight rubber core encased within a plurality of thin Kevlar layers bonded to the exterior wall of the core.

US Patent Publication No. 2010/0084064, entitled "Puncture Free Tire Tube", shows a puncture free tire tube, fitted under compressive deformation, into an annular outer wall which is detachably fitted to an annular rim. The puncture free tire tube contains a long member extrusion-molded with an elastomer, and has a cross sectional area of from 1 to 1.3 times the cross sectional area of the tube housing space of the annular outer wall.

Polymer foams, as a general class, are made up of a solid and a gas phase mixed together to form a foam. This generally happens by combining the two phases too fast for the systems to respond in a smooth fashion. The resulting foam has a polymer matrix comprising air bubbles or air tunnels which are known as either closed cell or open cell structure, respectively. Closed cell foams are generally more rigid while open cell foams tend to be more resilient or flexible. The gas used in the manufacturing process is known as the "blowing agent."

SUMMARY OF THE INVENTION

The present invention comprises an inner tube configured to be received within a wheel-tire assembly. The inner tube comprises a multi-layer foam insert that imitates or emulates the performance and weight characteristics of a pneumatic system through a select formulation of material density and ratios associated with the multiple foam layers. The disadvantages associated with the loss of air are eliminated while the performance and weight advantages of pneumatic tubes are preserved. Such assemblies are useful for all types of tires including tires for bicycles, motorcycles, automobiles, trucks and all other pneumatic tire systems.

The foam materials used in its manufacture contribute to enhanced performance while maintaining weight at or below existing levels. Through the use of extruded multicellular copolymers, the resilience, durability and energy return necessary for feel/ride performance are realized. The use of these high energy copolymers, in combination with lightweight high-strength extruded polystyrene in the core of the product can create a platform from which multiple sizes and multiple layer constructions are made. This technique is a novel approach to the replacement of pneumatic structures in many possible areas of transportation.

In one embodiment, the tire insert comprises three (3) layers or elements including an inner structure, an outer structure and a core structure disposed within an internal cavity defined by and between the inner and outer structures. In the described embodiment, the inner structure is fabricated from a high strength, high stiffness Expanded PolyPropylene (EPP) foam and the outer structure comprises a high elongation, low modulus Expanded Thermoplastic PolyUrethane (ETPU) foam. While the core structure may be comprised of a mixture of EPP foams, in the described embodiment, the core structure is comprised of a single high strength, high stiffness Expanded PolyPropylene (EPP) foam. To ensure a high efficacy structure, the EPP and ETPU foams are fabricated from a steam molding process.

BRIEF DESCRIPTION OF THE DRAWING

FIG. 3 shows a sectional view of second embodiment of a tire insert.

FIG. 4 shows a sectional view of a third embodiment of a tire insert.

FIGS. 7A-7E show a second method of forming a tire insert.

FIG. 9 depicts the isolated perspective view of the embodiment shown in FIG. 8 wherein one arcuate section is partially separated/exploded from another arcuate section, i.e., adjacent the first section, showing how the arcuate sections engage and interlock.

FIG. 10 is an isolated perspective view of one arcuate section depicting each of the interlocking ends.

FIG. 11 is cross-sectional view taken substantially along line 11-11 of FIG. 10 wherein an Expanded PolyPropylene (EPP) inner structure and an Expanded Thermoplastic PolyUrethane outer structure encapsulate an Expanded PolyPropylene (EPP) core structure having a substantially T-shaped cross-sectional configuration.

FIG. 12 is cross-sectional view taken substantially along line 12-12 of FIG. 10.

DETAILED DESCRIPTION OF THE INVENTION

A foam tire insert is disclosed for replacing pneumatic tubes, especially in bicycles, although the insert can also be used in other applications wherein air-filled tubes of varying types are employed. The insert is made through a foam construction technique using multiple layers, or sections, of foam material to yield a product having the feel and performance of pressurized air in a tire, without significantly increasing the weight of a typical pneumatic tube. With such construction, the need for pneumatic tubes can be eliminated for a large class of users.

The insert can made as a one piece annular component in its least expensive embodiment. Other embodiments include splitting the insert and using a clipping device at each end in order that the foam insert can be mounted without taking the wheel off of the bicycle. In addition, different quality level embodiments can be produced using different materials and different construction methods. This allows for different market segments by price and performance to be individually addressed.

Figure 1:
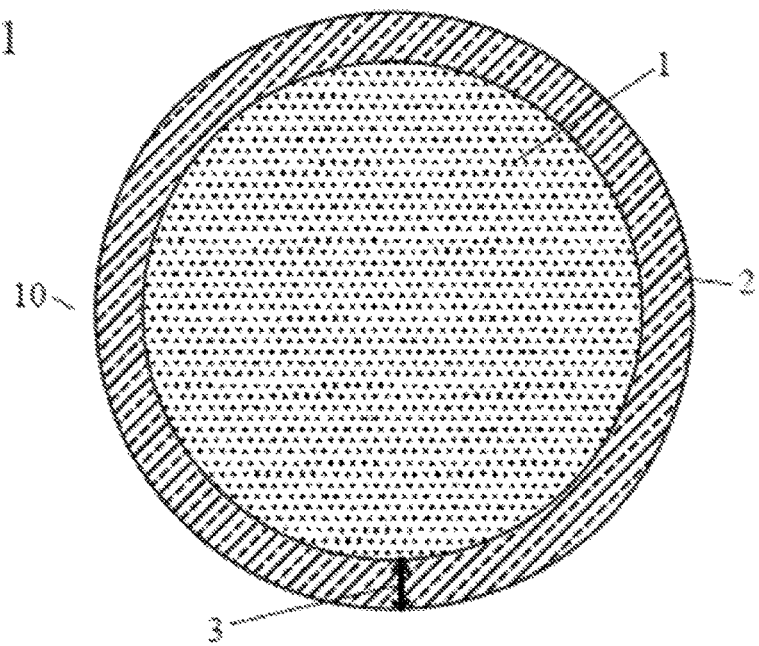
FIG. 1 shows a sectional view of a tire insert.
Figure 2:
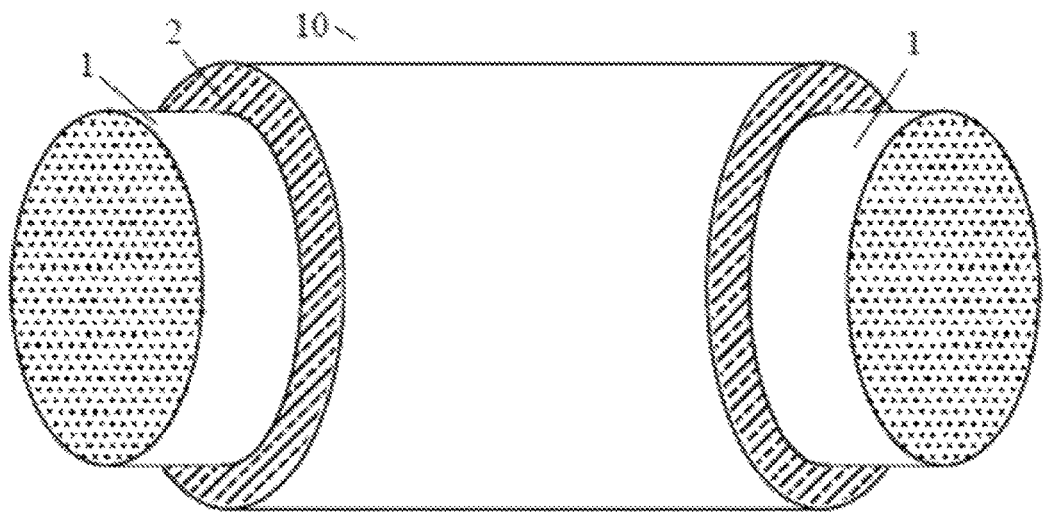
FIG. 2 shows a cut-away perspective view of an arcuate length of tire insert, with the outer layer cut away to show the inner layer.

FIGS. 1 and 2 show cross sectional views of a compound (multiple layer) foam tire insert 10 according to one embodiment of the invention, wherein the insert 10 is formed from a combination of distinct types of plastic foams known as polymer foams.

The core 1 of the insert 10 may be formed from a stiff, structurally durable, lightweight foam material. The core 1 contributes the long-term structural integrity of the insert 10, while providing the strength and mass, or the foundation, for the outer layer 2 to rest upon. An appropriate material for the core 1 of the insert 10 may be a light weight, non-compressible, flexible material that is in the class of a closed cell cross-linked ethylene copolymer foams, closed cell cross-linked polyethylene foam (XLPE) or other commercially available cross-linked polyethylene foams. These materials emulate the structural air pressure that a pneumatic system provides in a conventional pneumatic tire or tire insert.

The primary characteristics of the novel tire insert 10 include, low-weight, less than 5% compressibility, less than 1% retained deformation under-load and after load relief, long-term structural integrity, ease of handling, high tolerance manufacture and low cost. The closed cells in the structure help emulate and provide the structural aspect of the system. The desired material characteristics of the material allow the cell walls to be sufficiently flexible to undergo some level of deformation while maintaining the structural integrity of the insert 10 under load.

The outer layer 2 may be formed from a different foam material than that employed in the core 1, and is responsible for providing the rider with the feel and performance of a pneumatic inner tube system. The material of the outer layer 2 may provide the characteristics of high energy return, wide temperature tolerance, shape retention, durability over time, and the ability to be extruded so as to produce precision tolerances. Preferably, the material of the outer layer 2 does not become rigid in a range of temperatures between −20 C and +40 C, and has the durability to last three or more years.

An appropriate material for the outer layer 2 of the insert 10 may be a class of materials known as styrene-butadiene-styrene, or SBS. This substance is a hard rubber that's used for many products like shoes (i.e., the sole portion), tire treads, and other products where durability is an important material property. The material may be a block copolymer having a backbone chain composed of three segments: a long chain of polystyrene, a long chain of polybutadiene, and another long section of polystyrene.

SBS may also comprise a type of material called a thermoplastic elastomer (TPE). These are materials behave like elastomeric rubbers at room temperature, but when heated, flow like a thermoplastic. Most types of rubber are difficult to process because they are permanently cross-linked, although SBS and other thermoplastic elastomers manage to remain elastic, resilient or rubbery without being crosslinked. This makes such thermoplastic elastomers easy to process into useful products or shapes.

The use of SBS in the outer layer 2 of the insert 10 emulates the resilience of a conventional pneumatic structure. One type of SBS useful in forming the outer layer 2 is an Olefin Block Copolymer (OBC), which are polyolefins with alternating blocks of hard (highly rigid) and soft (highly elastic) segments. This block structure of OBCs offers a balance in performance between flexibility and heat resistance as compared to random polyolefin copolymers. This material may also have the distinct advantage of retaining stable performance characteristics over a wide range of temperatures, i.e., insuring correct function over a wide range of environmental conditions.

The outer layer 2 in this embodiment is applied evenly around the outside of the core 1 producing a uniform thickness 3 which determines the performance characteristics of the product. By varying the thickness 3, the pressure and performance characteristics of the insert may also be varied.

FIGS. 3 and 4 show cross sectional views of yet another embodiment of the insert 10, wherein the ratio of dimensions, the location of the core relative to the outer layer, and the thickness dimensions may be varied to yield different performance characteristics.

FIG. 3 shows an alternative embodiment of the tire insert 30, which yields the performance characteristics of high pressure, high performance and light weight. In this embodiment, the core 31 is larger relative to the outer layer 32, by comparison to the embodiment shown in FIGS. 1 and 2. Furthermore, the core 31 is offset toward the inner circumference 36 of the insert 30 such that the thickness 33 of the outer layer 32, nearest the inner circumference 36, is less than the thickness 34 of the outer layer 32 near the outer circumference 35 of the insert 30. This provides a high ratio of stiff, light core material 31 in comparison to a low ratio of high density, highly flexibility material in the outer layer 32.

FIG. 4 shows yet another embodiment of the tire insert 40, which may be used to emulate a low pressure tire, giving a rider greater comfort and forgiveness. In this embodiment, the core 41 is smaller relative to the outer layer 42, in comparison to the embodiment shown in FIGS. 1 and 2. Similar to the embodiment shown in FIG. 3, the core 41 is offset toward the inner circumference 46 of the insert 40 so that the thickness 43 of the outer layer 42, nearest the inner circumference 46, is less than the thickness 44 of the outer layer 42 near the outer circumference 45 of the insert 40. This provides a low ratio of stiff, light core material 41 by comparison to a high ratio of high density, highly flexibility material in the outer layer 42. This ratio of materials gives a uniquely high efficacy ride quality.

The ratio, form and material characteristics of the foam materials combined into a tubular structure produce the performance characteristics of the tire insert of the invention. These foam materials can be used in various ratios, and in various forms to emulate the desired characteristics of a pneumatically-inflated tube. That is, such foam materials may accurately imitate different types and pressures of tire & tube systems at a weight which compares favorably to such pneumatic systems.

In order to emulate the required pressures and performance of a pneumatic system in the multi-layer or multi-section insert model, three distinct factors must be considered. A first factor is the diameter of the cavity into which the foam insert must be inserted. This diameter is the equivalent space filled by a pneumatically inflated tube. The accurate measurement of this diameter, at the desired inflated pressure, is key to insuring a correct fit and/or function for the multi-layer or multi-section foam insert. Once this diameter is precisely measured, and the pressure of the system defined, then the design of the foam insert may begin.

A second factor is modelling the foam structure to achieve the desired weight distribution and pressure of a pneumatic system. Every tire has a recommended pressure rating and the foam insert must be constructed to emulate this pressure. The core material of the foam insert structure is a determining factor in achieving the desired pressure rating. The inner core material may be formed from a material that has weight below at least 20 Kg per cubic meter of foam material. This parameter insures that the total weight will be acceptable to the consumer. The inner lightweight, foam core "backbone" is key to the concept of a light-weight, high performance structure. Additionally, the core material must provide a weight density, i.e., in kPa, which is sufficiently high to emulate the pressure of the inflated tube. The conversion formula is 1.0 kPa to 0.15 PSI, i.e., one kilaPascal is equivalent to 0.15 Pounds per square inch.

Table 1, below, illustrates a variety of kPa and their corresponding PSI. Once a defined PSI is selected then a corresponding material can be selected.

TABLE 1

| kPa | PSI | |
|-----|------|---|
| 1   | 0.15 | |
| 100 | 14.50 | |
| 200 | 29.01 | |
| 300 | 43.51 | |
| 400 | 58.02 | |
| 500 | 72.52 | |
| 600 | 87.02 | |
| 700 | 101.53 | |

A third factor to achieve the required pressure and performance of a pneumatic system are the dynamic characteristics of the outer layer or section of the foam insert structure. This outer layer or section is critical to contributing to the dynamic performance of the foam structure. Without the outer layer or section, the feel and function of the tire would be "flat," "dead" or "numb". As a consequence, the tire/wheel system will not perform properly and will not provide the rider with the correct road surface performance/feedback. The thickness of this outer layer, in proportion to the light-weight inner foam core can be manipulated to achieve the desired final pressure and function of the system. Within the family of SBS (TPE) thermoplastic elastomers are many parameters of performance that can be defined. These material parameters can be manipulated in order to achieve the best performance for a given end user's purposes. The variations in thickness of the outer layer or section in combination with the almost limitless variations in material properties render the predictive modeling of structural performance problematic. In the end, physical prototyping with laboratory performance measurement is necessary to achieve the optimum solution for determining the correct materials, and ratios of materials, to determine the structure of the product.

Figure 5:
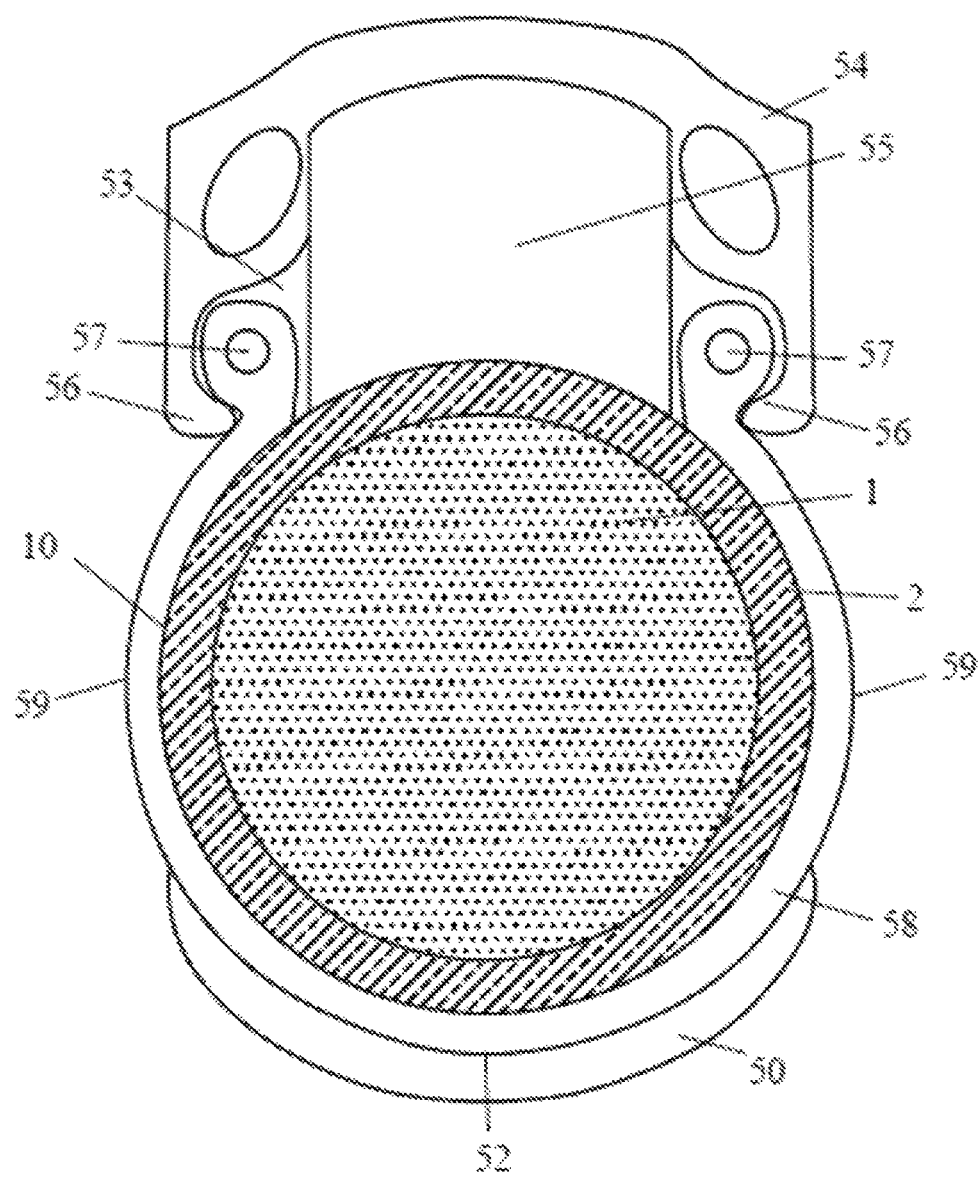
FIG. 5 shows a foam tire insert as mounted on a rim, within a tire.

FIG. 5 is a sectional view of a bicycle wheel wherein the foam insert 10 is mounted on a rim 54, within a tire 58. A foam pad 55 is placed around the rim 54 in the cavity 53 of the rim 54 to support the tire insert 10. The tire 58 has a sidewall 59, which is held within the edges 56 of the rim 54 by a bead 57 and has a tread 50 around an outer circumference 52 which is chemically and physically bonded to the tire 58 through a conventional vulcanization process.

Figure 6A:
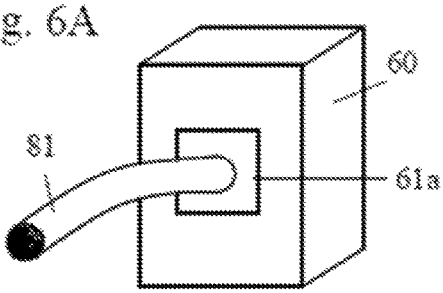
FIGS. 6A-6F shows a first method of forming a tire insert.

The determination of the structure of the insert 10 can occur in two ways. A first manufacturing method, shown in FIGS. 6A-6F, includes the use of an extrusion molding process to extrude polyethylene foams. In a first step 1 shown in FIG. 6A, the core 81 is extruded by a screw extrusion machine 60 having a die dimension 61a.

Figure 6B:
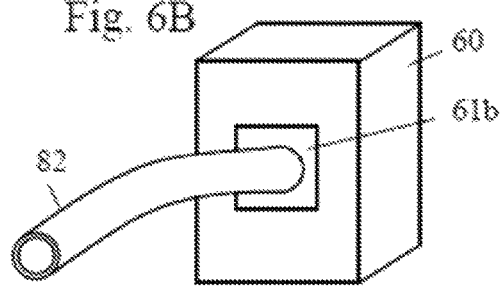

In a second step 2, shown in FIG. 6B, the outer layer or section is extruded by a screw extrusion machine 60 having a dimensional die 61b. It should be noted that steps 1 and 2 may be performed in any order, and the lengths of the core layer or core section 81 and/or the outer layer or section 82 can be made to length as needed, or long lengths can be made in advance in preparation for the succeeding steps described below, within the teachings of the invention.

Figure 6C:

In a third step 3 shown in FIG. 6C, the light-weight, stiff core material 81 is inserted into the denser more flexible outer layer 82, forming the combined insert 80. Optionally, an adhesive 84 can be applied to the outer surface of the core 81 or the inner surface of the outer layer 82, so as to provide adhesion between the core 81 and outer layer 82. An appropriate adhesive 84 for this process may be a low temperature spray-able hot melt adhesive that is hand sprayed on the product manually and then assembled into a final structure. A non-toxic adhesive which may be used is "Tec Bond 420" a sprayable hot melt adhesive available for purchase at Hotmelt.com.

Figure 6D:
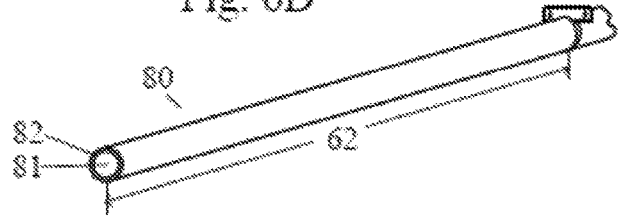

In a fourth step 4, shown in FIG. 6D, if the insert 80 is formed from long lengths of core 81 and outer layer 82 material, as noted in step 2 above, the combined insert 80 may be cut to a length 62 corresponding to the desired circumference of the finished tire insert 65. Alternatively, if the core 81 and outer layer 82 are each formed to an exact length 62, as mentioned in steps 1 and 2, before being combined in step 3, then this cutting step can be omitted.

Figure 6E:
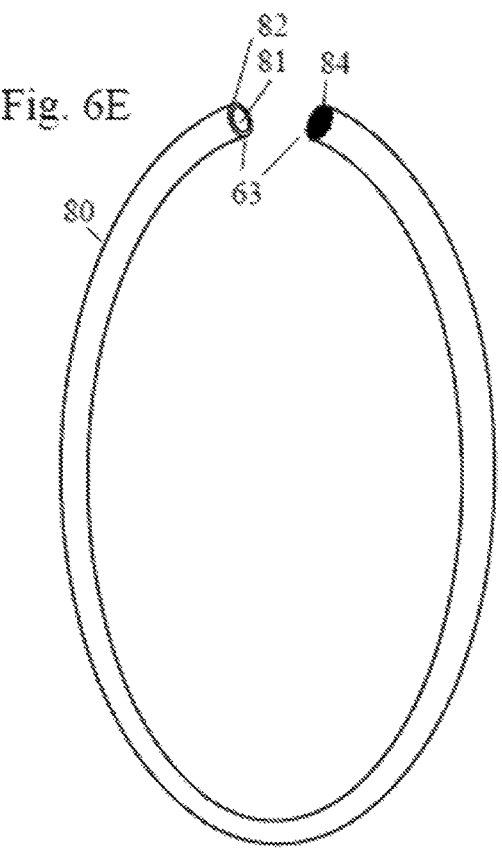

In a fifth step 5, depicted in FIG. 6E, an adhesive 64 is applied to both ends 63 of the insert 80. An appropriate adhesive 64 for this process may be a tape that is made from an acrylic foam which is viscoelastic in nature. This imparts energy absorbing and stress relaxing properties to the foam which provides the tape with an acrylic chemistry which provides outstanding durability performance. This tape utilizes a variety of specific foam, adhesive, color and release liner properties to provide each product/family with specific features. These include adhesion to specific, or a broad range of materials, conformability, high tensile strength, high shear and peel adhesion, resistance to plasticizer migration, and UL746C recognition.

Figure 6F:
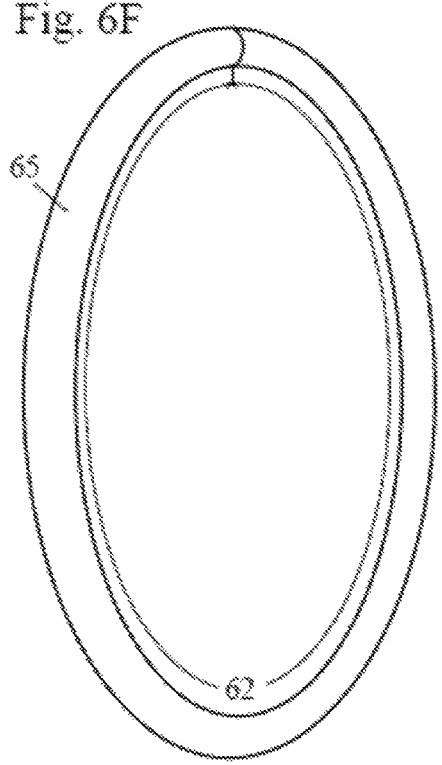

In a next step 6 illustrated in FIG. 6F, the ends 63 of the insert 80 are joined, forming a finished tubular tire insert 65 that is ready for use in a tire system.

The second method uses a co-extrusion process using an extrusion machine 70 with a compound die 73. This method, shown in FIGS. 7A-7D comprises a plurality of steps described in the subsequent paragraphs:

In a first step 1, shown in FIG. 7A, the material for the core 81 and the material for the outer layer 82 are loaded into separate feed hoppers 71 and 72 in the extrusion machine 70 at the same time.

In a second step 2, depicted in FIG. 7B, the extrusion machine 70 is operated with the compound die 73 in place to simultaneously extrude the inner core 81 and the outer layer 82 from the compound die 73 as a single length of a complete tubular insert 80.

It should be noted that the insert 80 can be made to length as needed, or can be made in advance to long lengths, in preparation for the succeeding steps described below.

In a third step 3, illustrated in FIG. 7C, if the insert 80 is formed as a long length of material, as noted in step 2 above, the insert 80 is cut to the length 74 corresponding to the desired circumference of the finished tire insert 78. Alternatively, if the insert 80 is formed to exact length 74 in step 2, the cutting step can be omitted.

In a fourth step 4, shown in FIG. 7D, an adhesive 76 is applied to both ends 77 of the insert 80. An appropriate adhesive 76 for this process is a tape that is made from an acrylic foam which is viscoelastic in nature. This imparts energy absorbing and stress relaxing properties to the foam which provides the tape with an acrylic chemistry which provides outstanding durability performance. This tape utilizes a variety of specific foam, adhesive, color and release liner properties to provide each product/family with specific features. These include adhesion to specific, or a broad range of materials, conformability, high tensile strength, high shear and peel adhesion, resistance to plasticizer migration, and UL746C recognition.

In a final step 5, illustrated in FIG. 7E, the ends 77 of the insert 80 are joined, forming a finished tubular tire insert 78 that is ready for use in a tire system.

Figure 8:
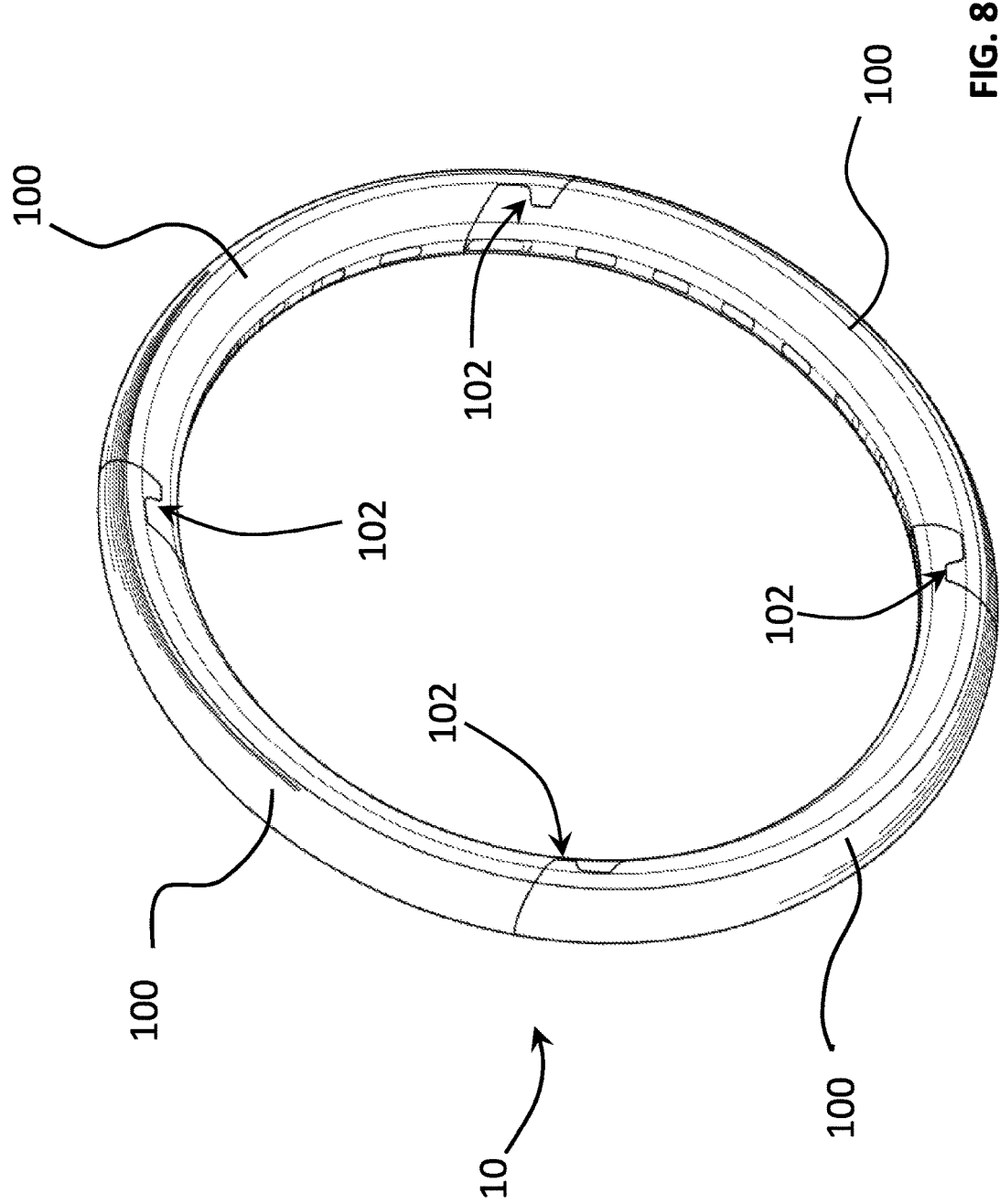
FIG. 8 depicts an isolated perspective view of another embodiment of the tire insert including four (4) ninety-degree (90°) arcuate sections, which in combination, form a tire insert.

In yet another embodiment of the invention, illustrated in FIGS. 8-14, a slightly different insert configuration is employed along with a different method of manufacture to achieve a tire insert having essentially the same feel and performance of a conventional pneumatic inner tube. In FIGS. 8 and 9, four arcuate sections 100 are joined along interlocking interfaces 102 to produce a three-hundred and sixty degree (360° toroidal-shaped structure. Each of the arcuate sections 100 are produced by a plurality of selectively-shaped foam structures which will be described in greater detail in the subsequent paragraphs. The described embodiment shows four (4) interlocking arcuate sections 100, though it will be appreciated that a greater or fewer number of individual arcuate sections may be employed. For example, one embodiment may include a single section which interlocks along a single interface. In yet another embodiment, three (3) arcuate sections may be employed, each extending two-hundred and seventy degrees (270°) and interlocking along three (3) interfaces. And, in yet another embodiment, as many as six (6) arcuate sections may be employed, each extending sixty (60°) degrees and interlocking along six (6) interfaces. In FIG. 9, each arcuate section 100 is identical and includes a forward interlock 102a and an aft interlock 102b, which join with a corresponding interlock of an adjacent arcuate section 100. The four arcuate sections 100, therefore, are joined along four interlocking interfaces to produce the tire insert 10.

In FIGS. 10 and 11, each arcuate section 100 includes an inner structure 112, an outer structure 114 and a core structure 116 enveloped by the inner and outer structures 112, 114. More specifically, the inner structure 112 defines a inner peripheral surface 122, a first mating surface 124, and a first core engagement surface 126. The outer structure 114 defines an outer peripheral surface 132, a second mating surface 134 and a second core engagement surface 136. Finally, the core structure 116 includes a T-shaped core having an outer cross member 144 and a central web 146 projecting orthogonally from the outer cross member 144.

In the described embodiment, and referring to FIGS. 10, 11 and 12, the first core engagement surface 126 of the inner structure 112 defines a circumferential recess for receiving the T-shaped core structure 116. Furthermore, the first mating surface 124 of the inner structure 112 engages the second mating surface 134 of the outer structure 114 such that the core structure 116 is received within an internal; cavity 150 defined by, and between, the first and second core engagement surfaces 126, 136. The mating surfaces 124, 134 of the inner and outer structures 112, 114 are adhesively bonded together to integrate the structures 112, 114 and 116 of the arcuate section 100. To further integrate the various structures 112, 114, and 116, the first core engagement surfaces 126 of the inner structure 112 may be adhesively bonded to mating surfaces 152 of the central web 146 of the core structure 116. At the same time, the second core engagement surface 136 of the outer structure 114 may be bonded to an upper surface 154 of the T-shaped core, i.e., the cross member 144 thereof, while the first core engagement surface 126 may be bonded to an inclined lower surface 156 of the cross-member 144.

Figure 13:
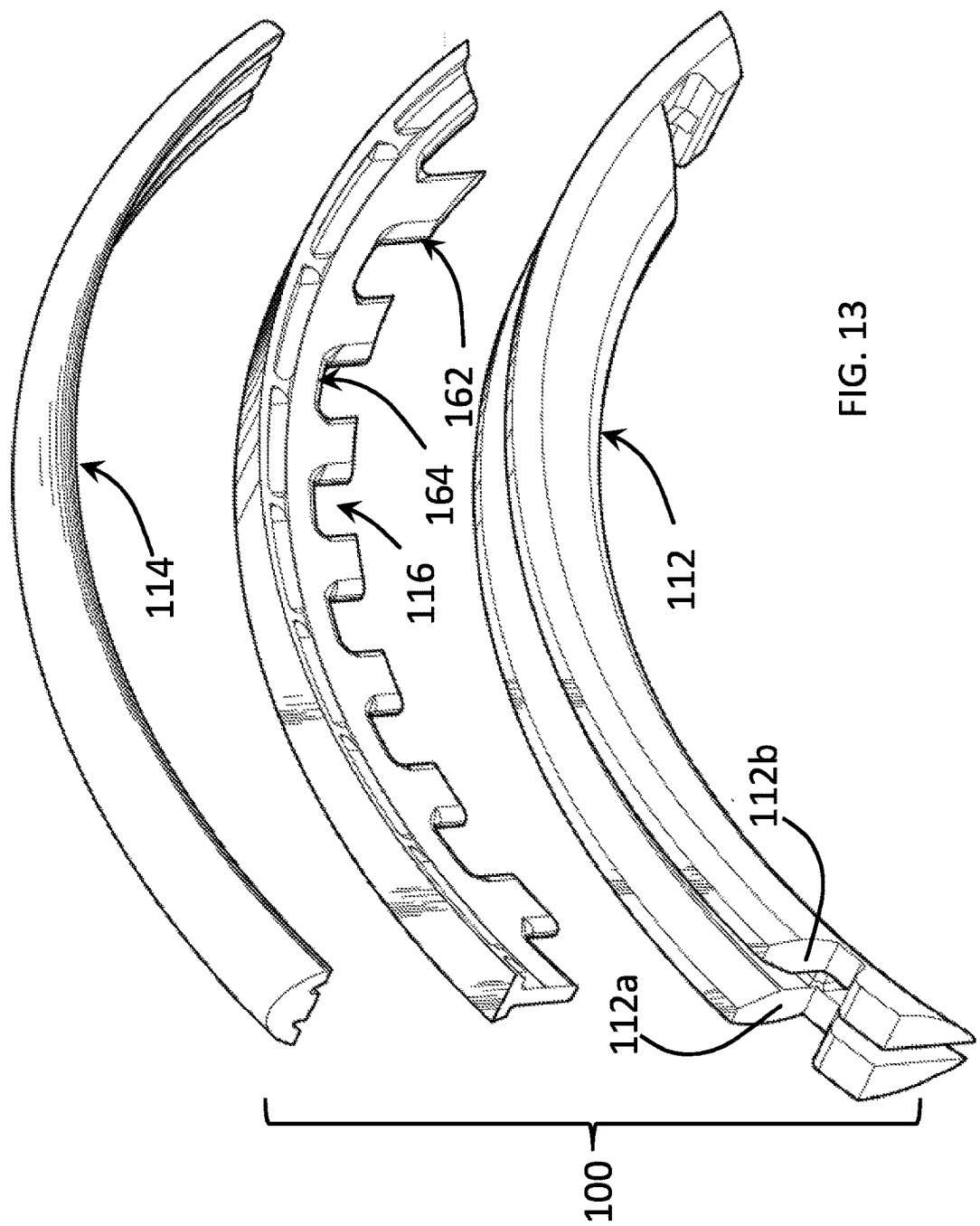
FIG. 13 is an exploded perspective view of the inner, outer and core structures of a single arcuate section of the tire insert.
Figure 14:
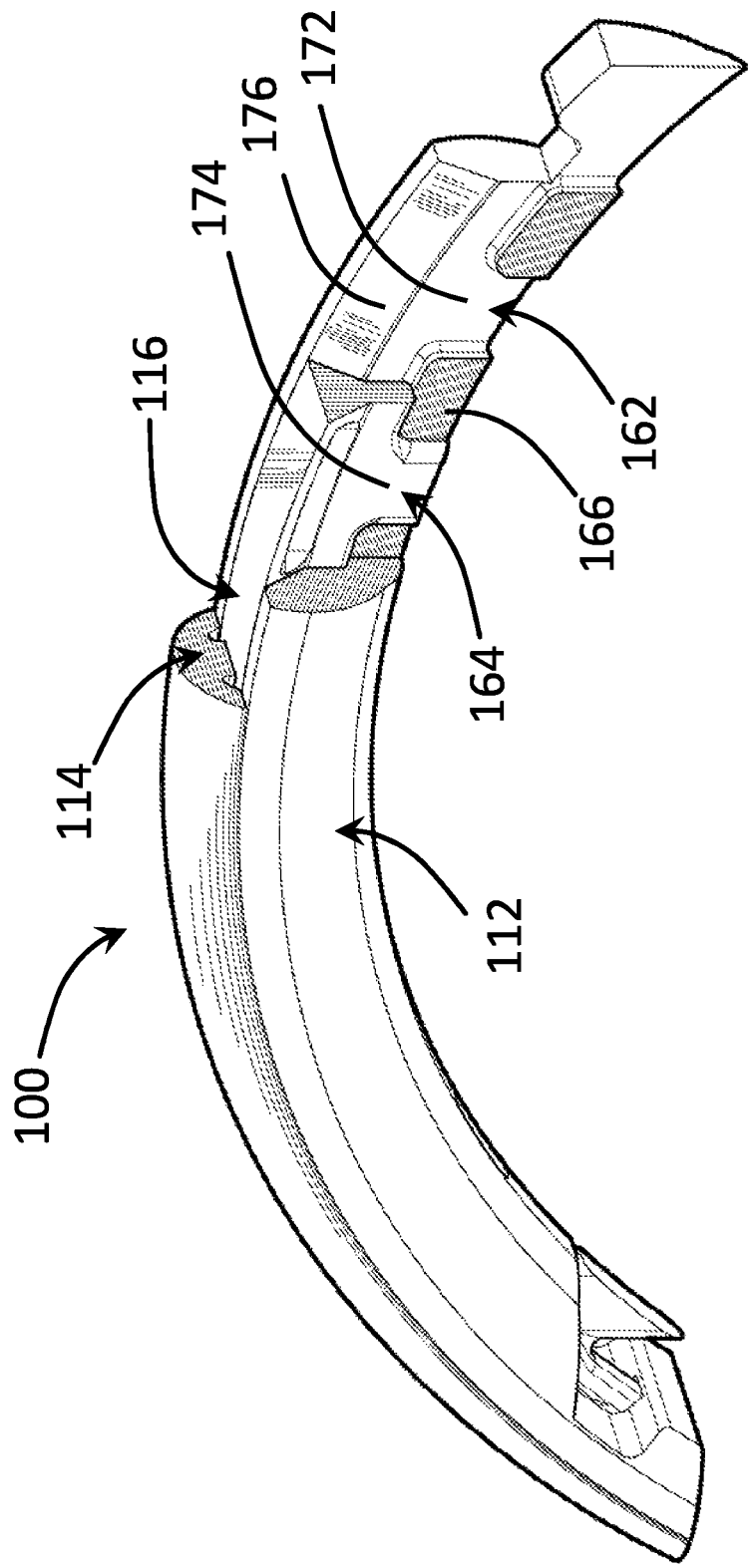
FIG. 14 is an isolated perspective view of the arcuate section depicting various sectional views along the circumference of the arcuate section wherein one section depicts a view through the first section, another section depicts a partial section through the second section, and yet another section depicts a partial section through the third section.

In FIGS. 11 and 13, the structures 112, 114, and 116 may be further integrated by forming radially-oriented pockets 162 at equiangular locations along the inner circumference of the tire insert 10. In the described embodiment, each of the inner structures 112 includes seven (7) pockets 162, disposed approximately twelve degrees (12°) apart and each receiving a radially projecting portion 164 of the central web 146. As such, the core structure 116 is circumferentially fixed relative to the radial inner structure 112 of the arcuate section 100.

To facilitate fabrication and assembly, the inner structure 112 may be bifurcated along a substantially vertical plane P so as to produce first and second inner structures 112a, 112b which may be bonded to each other along vertical surfaces 166 between the pockets 162, also approximately twelve degrees (12°) apart. It will be appreciated that when bifurcating each of the split inner structures 112a, 112b, each defines a portion of the: (i) inner radial surface 122, (ii) first mating surface 124, and (iii) first core engagement surface 126. Similar to the embodiment described above, the split inner structures 112a, 112b may be adhesively bonded to portions of the cross-member 144 and the central web 146. That is, in FIG. 14, pockets 162 are bonded to the lateral surfaces 174 of the radially projecting portions 164 while an upper beveled, or inclined surface, 176 mates with, and bonds to, an inclined lower edge 156 (see FIG. 12) of the cross-member 144.

Similar to the previous embodiments, the inner, outer and core structures 112, 114, and 116 are each fabricated from a foam material wherein the radially innermost or inner structure 112 comprises a first foam material while the radially outermost or outer structure 114 comprises a second foam material, different than the first foam material. In the described embodiment, the inner structure 112 comprises a first foam material, the outer structure 114 comprises a second form material and the core structure 116 comprises a foam material which is generally identical to the first foam material, though it may be a combination of the first and second foam materials. As will be discussed in the subsequent paragraphs, the first foam material is preferably an Expanded PolyPropylene (EPP) foam while the second foam material is preferably an Expanded Thermoplastic PolyUrethane (ETPU) foam.

While the various layers and sections of the tire insert may be produced in accordance with the description (supra), certain drawbacks were discovered with respect to fabricating particular materials via the previously discussed manufacturing approaches. For example, certain materials do not provide the range of properties which are useful for a tire insert designed for a particular application, e.g., off-road racing. Furthermore, at present, the desired materials may not be efficiently manufactured using the lowest cost manufacturing methods.

As eluded to in the preceding paragraphs, the radially inner structure 112 may be fabricated from an Expanded PolyPropylene (EPP) material while the radially outer structure 114 may be fabricated from an Expanded ThermoPlastic PolyUrethane (ETPU) material. The core structure 116 may be fabricated from a combination of the above materials, but in the described embodiment is fabricated from an EPP material alongside, and along with, the radially inner structure 112. As will be discussed in greater detail hereinafter, each material provides unique properties which uniquely satisfy the performance properties of the tire insert 10.

In the course of development it was discovered that product employing the preferred materials could not be efficiently manufactured by means of certain of the lowest cost manufacturing methods, e.g., an extrusion molding process. After many iterations, steam molding was chosen as one of the preferred manufacturing method for molding the EPP and ETPU materials employed in the manufacture of the tire insert 10.

A steam-molded EPP foam is a highly versatile closed-cell bead foam which provides a unique blend of mechanical properties including excellent impact resistance, energy absorption, insulation, heat resistance, and buoyancy/flotation properties. Furthermore, it is lightweight, recyclable, exhibits excellent surface protection, and offers high resistance to oil, chemicals, and water. Finally, and perhaps most importantly, a steam molded EPP foam offers an exceptionally high strength to weight ratio. That is, EPP foams are extremely strong and stiff while being exceedingly low weight. It is for these reasons that the use of EPP has gained increasing momentum and widespread acceptance in the automotive, packaging, and construction industries.

A steam-molded Expanded Thermoplastic PolyUrethane (ETPU) foam offers very different properties than a steam-molded EPP foam. While an EPP foam offers high strength coupled with high stiffness, an ETPU foam offers high elongation in combination with high tensile strength. Most importantly, an ETPU foam remains highly elastic and soft over a wide range of temperatures. Tests of resilience/elasticity demonstrate that ETPU foams achieve rebound properties of more than fifty-five percent (55%) while dynamic mechanical analysis shows that, even at extremely low temperatures of minus twenty degrees Celsius (−20° C.), such ETPU foams remain highly dynamic, soft and stretchy.

Whether processing an EPP or ETPU foam, steam temperature, in the steam-chest molding machines may or may not be coupled with steam pressure. That is, the molding machine may induce pressure by gas pressurization as a pressure filling process, or by mechanical means via a crack filling process.

In the former, a pressure gradient is created by producing a counter pressure in the mold. Injectors are used to supply pressurized foam beads into the mold cavity while superheated steam is introduced at high pressure in the mold. The superheated steam forces the foam beads, present in the mold chamber, to expand further reducing the amount of air trapped among and between the beads. Upon reaching the melting or glassine temperature, the beads fuse to produce the final product.

In the latter, pressure is applied to the foam beads by mechanical means rather than by an injected gas. That is, compression may be achieved by the relative movement of the mold halves, e.g., moving a male mold into a female mold cavity, to reduce entrapped air. To achieve lower densities and better surface finish, a method of pre-pressurization may be employed. In this method, an overpressure is first generated within the foam beads in a pressure increasing tank. Subsequent or additional heat causes the beads to expand within a fixed volume mold cavity, hence causing the beads to be fully pressurized within the mold cavity.

TABLE II below depicts the critical variables to run a successful steam molding cycle in connection with fabricating the radially inner structure 112, the radially outer structure 114 and the core structure 116 of the tire insert 10.

TABLE II

| Layer/Element | Steam/Air Temperature (° C.) | Steam/Air Pressure (MPa) | Flow Rate (L/Min) |
| --- | --- | --- | --- |
| Inner Structure | 110-200 | 0.38-0.41 | 80-120 |
| Core Structure | 110-200 | 0.38-0.41 | 80-120 |
| Outer Structure | 110-200 | 1.30-1.48 | 100-140 |

TABLE III below depicts the critical materials used in the production of a tire insert for filling the toroidal void associated with a conventional pneumatic inner tube tire. It is this combination of materials which yields a precise combination of strength, stiffness and flexibility to reproduce the feel and performance of the pneumatic inner tube while preventing rupture and the hazards associate therewith on the road.

TABLE III

| Layer/Element | Material(s) | Density (kg/inches$^3$) |
| --- | --- | --- |
| Inner Structure | Expanded PolyPropylene (EPP) EPP 11, EPP 15, EPP 20 & EPP 30 | 20-80 |
| Core Structure | Expanded PolyPropylene (EPP) EPP 11, EPP 15, EPP 20 & EPP 30 | 20-80 |
| Outer Structure | Expanded Thermoplastic PolyUrethane (ETPU) | 200-300 |

Figure 15:
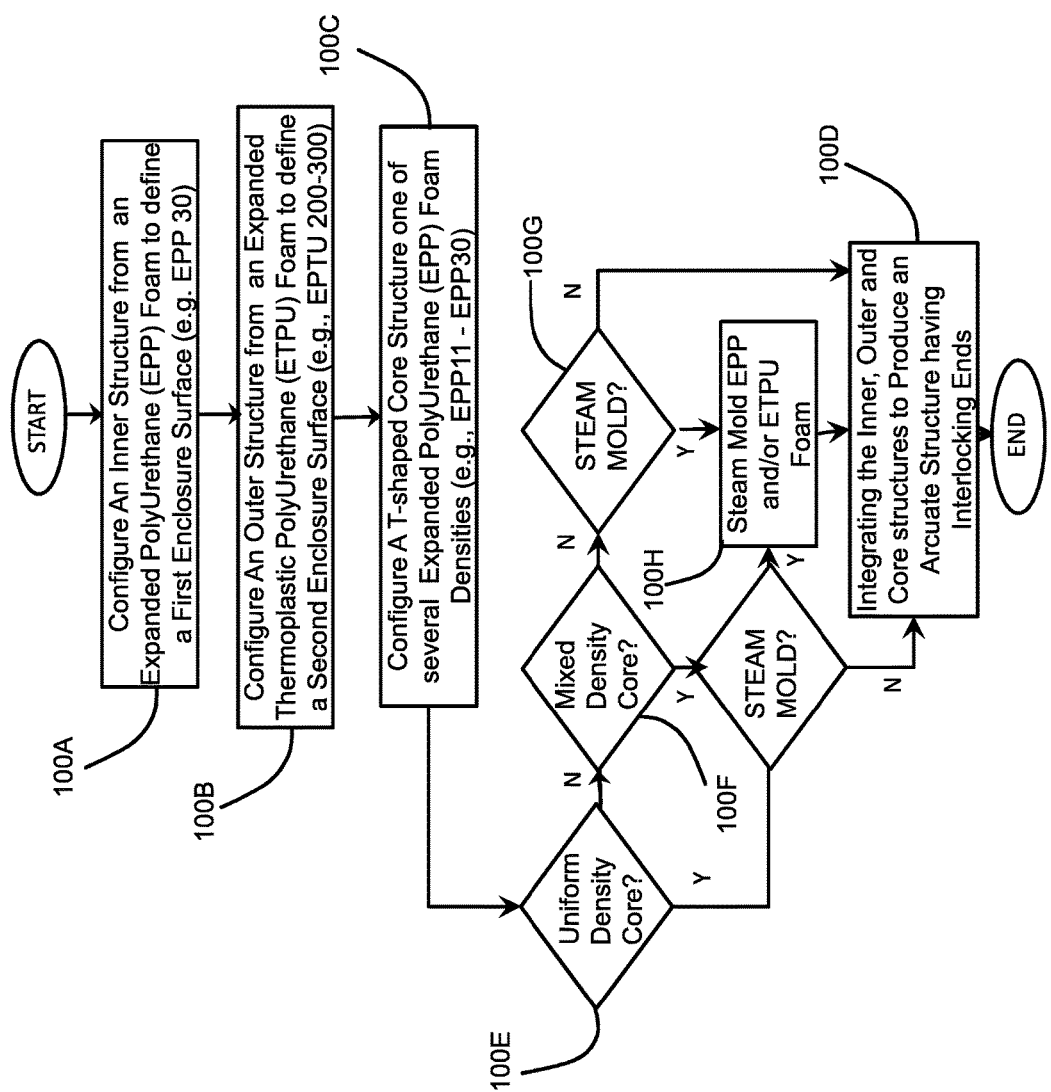
FIG. 15 is a flow diagram of the method steps associated with fabricating a single arcuate section of the tire insert.

In FIG. 15 a schematic or diagrammatic view of the method steps associated with fabricating a single arcuate section is depicted. In steps 100A and 100B a mold of the inner and outer structures 112, 114 are configured. Therein the arcuate inner structure 112 having a T-shaped annular groove is configured along with the outer structure 114, shaped in the form of a circular segment. As mentioned earlier, the inner structure 112 may include a plurality of equally spaced pockets for receiving a plurality of radial projections 162 from the web section of the core structure 116. In step 100C, the core structure 116 is configured to include a generally T-shaped cross-sectional shape which is received in the T-shaped annular groove, or first enclosure surface 126 of the inner structure 112.

The inner structure 112 will generally be fabricated from an Expanded PolyPropylene (EPP) to effect high stiffness and strength while the outer structure 114 will generally be fabricated from an Expanded Thermoplastic Polyurethane (ETPU) to yield exceptional rebound properties. With respect to the former, the EPP foam may be EPP 30, but it should be appreciated that the same may be selected from foams varying from EPP 11-EPP 30. With respect to the latter, the ETPU foam is preferably ETPU 200, but may also be selected from foams ranging from ETPU.200-ETPU 300.

In step 100D, the inner, outer and core structures 112, 114, 116 may be integrated in a variety of ways, however, adhesive bonding will be the most widespread of the available techniques. Before integrating the structures, however, various other steps must be addressed to yield the desired article. More specifically, steps 100E and 100F specifically address the core and whether it is to be fabricated from a uniform density core, in Step 100E, or whether it is to be fabricated from an admixture of EPP foams, i.e., an EPP foam having a range of densities, in step 100F. With respect to Step 100F, the EPP foams may be selected from a range of EPP foams, e.g., EPP 11-EPP 30. In the described embodiment, the inner structure 112 is fabricated from EPP 30, and the core structure 116 is fabricated from EPP 15. In a next step 100G, a more general question is considered regarding whether the EPP and ETPU foams associated with the inner, outer and core structures 112, 114, 116 are to be steam molded. If the answer is yes, then the structures 112, 114, 116 are steam molded in step 100H. If not, then, individual structures are fabricated by other means, such as the methods and techniques described supra.

In summary, the multi-density, multi-layered, multi-sectioned structure emulates the characteristics of a pneumatic tube, eliminates the potential for the loss of air and the hazards to the rider associated with sudden air loss in a tire. The design variables associated with multiple layers of the construction and multiple sections of foam material allow the tire insert to emulate the characteristics of: (i) air pressure, (ii) performance and (iii) weight. These variables can also be used to manipulate and achieve any level of desired performance.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

The invention claimed is:

1. A method of making a tire insert comprising the steps of:
   (a) configuring an inner structure from an Expanded PolyPropylene (EPP) foam to produce a peripheral inner surface, a first mating interface surface and a first core engagement surface;
   (b) configuring an outer structure from an Expanded ThermoPlastic PolyUrethane (ETPU) foam to produce a peripheral outer surface, a second mating interface surface and a second core engagement surface;
   (c) configuring a core structure from an Expanded PolyPropylene (EPP) foam having a foam core density, the core structure forming a substantially T-shaped core enveloped by the first and second core engagement surfaces; and
   (d) integrating the inner, outer and core structures by: (i) joining the first mating interface surface with the second mating interface surface, (ii) joining the first core engagement surface with a first surface of the T-shaped core, and (iii) joining the second core engagement surface with a second surface of the T-shaped core.

2. The method of claim 1 wherein the step of configuring the core structure includes the step of configuring the core structure from an Expanded PolyPropylene (EPP) foam having a uniform density.

3. The method of claim 2 wherein the step of configuring the core structure includes the step of steam molding the EPP foam.

4. The method of claim 1 wherein the step of configuring the core structure includes the step of selecting an EPP foam density ranging from between an EPP 11 through an EPP 30.

5. The method of claim 1 wherein the step of configuring the inner structure includes steam molding the EPP foam.

6. The method of claim 1 wherein the step of configuring the outer structure includes the step of steam molding the ETPU foam.

7. A method of making a tire insert comprising the steps of:
(a) steam molding beads of Expanded PolyPropylene (EPP) to produce an inner structure defining a peripheral inner surface, a first mating interface surface and a first core engagement surface;
(b) steam molding beads of Expanded ThermoPlastic PolyUrethane (ETPU) to produce an outer structure defining a peripheral outer surface, a second mating interface surface and a second core engagement surface;
(c) steam molding beads of Expanded PolyPropylene (EPP) to produce a core structure forming a substantially T-shaped cross-sectional configuration, the core structure enveloped by the first and second core engagement surfaces;
(d) adhesively bonding the first and second mating interface surfaces to join the inner and outer structures; and
(e) adhesively bonding the first and second core engagement surfaces to the core structure to integrate the core structure with the surrounding inner and outer structures.

8. The method of claim 7 wherein the step of steam molding beads of EPP to produce an inner structure further comprises the step of: steam molding beads of EPP to produce first and second portions of the inner structure each having an engagement surface suitable for adhesively bonding the first and second portions together.

9. The method of claim 7 wherein the step of steam molding beads of EPP to produce an inner structure further comprises the step of splitting the molded inner structure along a vertical plane normal to the rotational axis of the tire insert for subsequent connection along the vertical plane.

10. The method of claim 7 wherein the step of steam molding beads of EPP to produce an inner structure further comprises the step of selecting a mixture of EPP foam beads having density values within a range of between an EPP 11 through an of EPP 30.

* * * * *